United States Patent [19]
Wetzel

[11] Patent Number: 5,131,729
[45] Date of Patent: Jul. 21, 1992

[54] VEHICLE BRAKE SYSTEM WITH ANTI-SKID APPARATUS

[75] Inventor: Gerhard Wetzel, Korntal, Fed. Rep. of Germany

[73] Assignee: Robert Bosch GmbH, Stuttgart, Fed. Rep. of Germany

[21] Appl. No.: 606,267

[22] Filed: Oct. 31, 1990

[30] Foreign Application Priority Data

Dec. 7, 1989 [DE] Fed. Rep. of Germany ....... 3940427

[51] Int. Cl.$^5$ ................................................ B60T 8/32
[52] U.S. Cl. ...................... 303/113 AP; 303/115 PP; 303/111; 303/DIG. 6
[58] Field of Search ............ 303/111, 113 AP, 115 R, 303/115 PP, 116 R, 842

[56] References Cited

U.S. PATENT DOCUMENTS

| | | |
|---|---|---|
| 3,980,346 | 9/1976 | Leiber . |
| 4,033,637 | 7/1977 | Leiber . |
| 4,491,919 | 11/1985 | Leiber ............................ 303/111 X |
| 4,593,955 | 6/1986 | Leiber ............................ 303/111 X |
| 4,600,244 | 7/1986 | Leiber ............................ 303/111 |
| 4,758,053 | 7/1988 | Yasuno ........................... 303/111 X |
| 4,861,114 | 8/1989 | Takata ........................ 303/113 AP X |
| 4,943,123 | 7/1990 | Takeda et al. ............ 303/113 AP X |

FOREIGN PATENT DOCUMENTS

| | | |
|---|---|---|
| 0178817 | 4/1986 | European Pat. Off. . |
| 0319715 | 6/1989 | European Pat. Off. ...... 303/113 AP |
| 2433092 | 1/1976 | Fed. Rep. of Germany . |
| 2449481 | 4/1976 | Fed. Rep. of Germany . |
| 2459775 | 7/1976 | Fed. Rep. of Germany . |
| 3725811 | 2/1989 | Fed. Rep. of Germany . |
| 1520286 | 8/1978 | United Kingdom . |
| 2206386 | 1/1989 | United Kingdom ................ 303/111 |
| 88/00542 | 1/1988 | World Int. Prop. O. . |

Primary Examiner—Matthew C. Graham
Assistant Examiner—Peter M. Poon
Attorney, Agent, or Firm—Edwin E. Greigg; Ronald E. Greigg

[57] ABSTRACT

A known vehicle brake system having four wheel brakes, belonging to two brake circuits, for four wheels has an anti-skid apparatus with two electrically controllable brake pressure modulators, two wheel rotation sensors, and two brake pressure adaptors. The wheel rotation sensors are assigned to one front wheel and one diagonally opposed rear wheel, and each controls one brake pressure modulator, which belongs to the same wheel as the wheel rotation sensor. The brake pressure of a wheel brake located on the same axle on the opposite side of the vehicle is also controlled by a brake pressure modulator via a brake pressure adaptor. If only one wheel rotation sensor is provided per axle, only the wheel associated directly with the wheel rotation sensor can be braked optimally. The other wheel on the same axle may be overbraked or underbraked. This interferes with controllability of the vehicle and/or may have the disadvantage of overly long stopping distances. In the novel vehicle brake system, each of the two wheel rotation sensors is assigned to a separate front wheel and controls one brake pressure modulator for its respective front wheel. The two rear wheel brakes are each coupled via a brake pressure adaptor to the brake pressure modulator on the same side. A pressure reduction for the right front wheel that is effected in anti-skid operation results in a pressure reduction in the same direction for the right rear wheel.

20 Claims, 1 Drawing Sheet

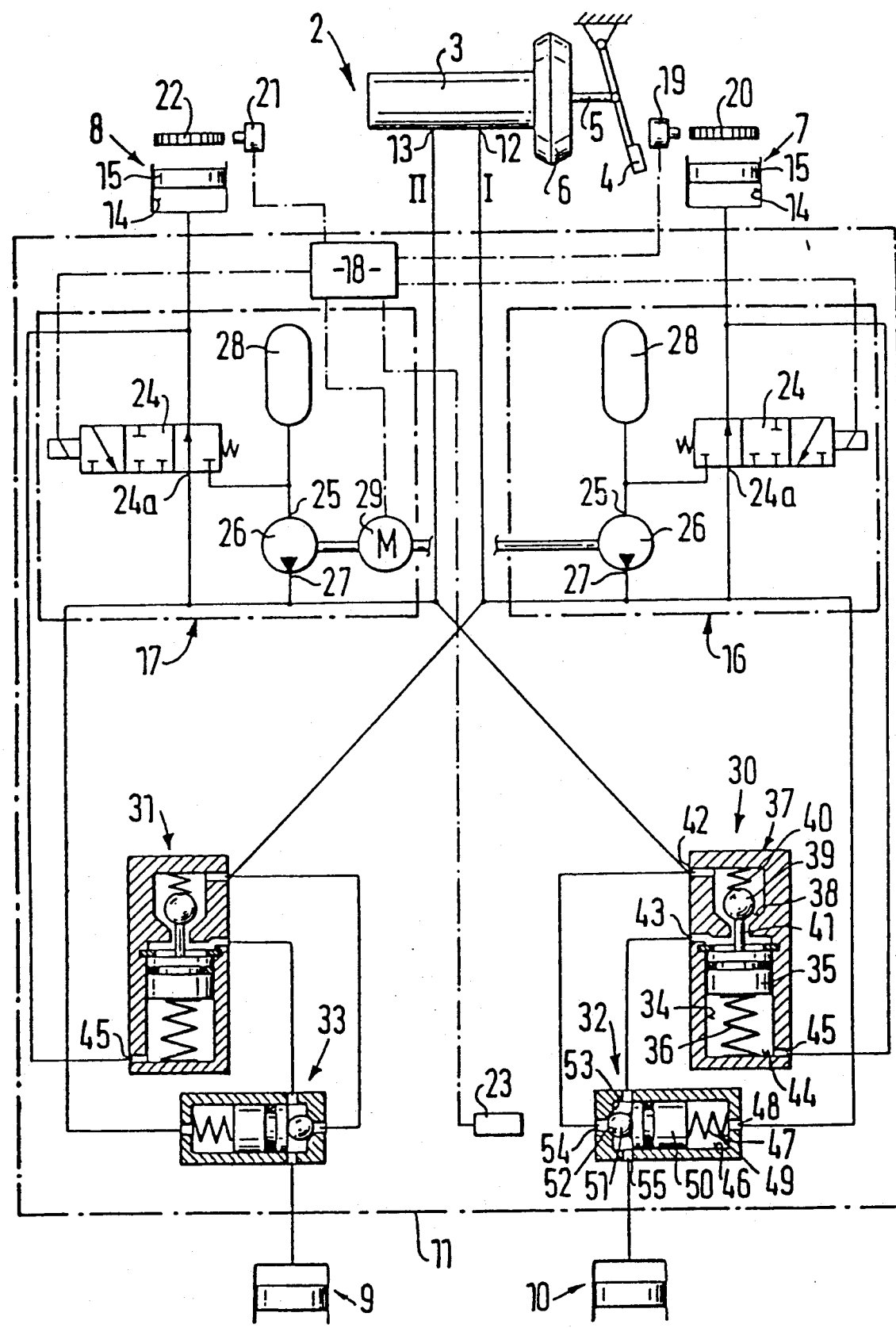

VEHICLE BRAKE SYSTEM WITH ANTI-SKID APPARATUS

BACKGROUND OF THE INVENTION

The invention is based on a vehicle brake system as defined hereinafter.

German patent applications DE-OS 24 33 092, DE-OS 24 49 481, DE-OS 24 59 775 and DE-OS 37 25 811 all disclose vehicle brake systems having dual-circuit brake pressure sources that are controllable with a brake pedal, each having two brake circuits terminating at wheel brakes and an anti-skid apparatus, which has a brake pressure modulator built into one of the brake circuits and a brake pressure adaptor built into the other brake circuit. The brake pressure adaptors each comprise a cylinder, a piston, a restoring spring, and a 2/2-way valve that is closable by the piston when it is displaced counter to the restoring spring. The applicable cylinder communicates with the brake pressure modulator via a control connection and is controllable by the brake pressure modulator. A front wheel brake and a diagonally opposed rear wheel brake are connected directly to a brake pressure modulator, for instance in accordance with DE-OS 24 33 092. Via the associated brake pressure adaptor, the other front wheel brake and the other rear wheel brake can be supplied with brake pressure from the brake pressure source. In this brake system, the brake pressure modulator is controlled as a function of the rotational behavior of at least one front wheel, which can be driven in common with the other front wheel via a differential gear and the rotation of which can be observed by means of a wheel rotation sensor disposed on the differential gear. Brake pressure modulators therefore operate by the select-low principle with respect to the two front wheels, so that a danger of locking at one front wheel leads to reductions in brake pressure at all the wheel brakes.

In the vehicle brake system of DE-OS 24 59 775, both front wheel brakes are jointly connected to the brake pressure modulator, and the brake pressures of the rear wheel brakes are jointly adaptable to the front wheel brake pressures by means of the brake pressure adaptor. Each front wheel has its own wheel rotation sensor. The controlling intervention via a control unit upon the single brake pressure modulator of this vehicle brake system is effected either by the select-low principle or by intermittent alternation between the select-low and the select-high principle. The anti-skid apparatus operating by the select-low principle has the disadvantage that the wheel rotation sensor of which the signals first show a danger of wheel locking can reduce the brake pressure in the entire brake system. This has the disadvantage of long stopping distances. Although the anti-skid apparatus that is operated by the select-low and the select-high principle in alternation does intermittently avoid disadvantageously extensive brake pressure reduction, it requires complicated control logic, which still cannot always prevent locking of at least one wheel. Since in addition to the two front axle wheel rotation sensors, a wheel rotation sensor is also disposed on the differential gear of the rear axle, a detected danger of the locking of a rear wheel, tripped for instance by cornering, in the select-low mode can lead to a substantial brake pressure reduction. On the other hand, if the brake pressure modulator is controlled in the select-high mode, then depending on prevailing conditions the vehicle may unexpectedly tend to oversteer or understeer when cornering.

These previously known vehicle brake systems include safety devices, which assure that if the controllable brake pressure modulators should fail, the pressure of the brake pressure source in the other, still-intact brake circuit reaches the wheel brakes associated with the brake pressure adaptor unhindered, thus assuring the regulation minimum stopping times of the vehicle. The safety devices for instance comprise 3/2-way valves of complicated structure, which are hydraulically controllable by means of pressures of the brake pressure source.

U.S. Pat. No. 4,491,919 and European Patent 0 178 817 disclose vehicle brake systems equipped with two brake circuits and wheel brakes for four wheels, the anti-skid apparatuses of which each have two individually controllable brake pressure modulators. The left front wheel has one of the brake pressure modulators assigned to it, which as a function of the rotation of this front wheel modulates the brake pressure of its front wheel brake and at the same time the brake pressure of a diagonally opposed rear wheel brake. The other brake pressure modulator is similarly assigned to the other front wheel and also modulates the brake pressure of the diagonally opposed rear wheel brake. In cornering, for instance with high sideways acceleration, the brake pressure of the front wheel on the inside of the curve is reduced earlier and/or to a greater extent than that of the front wheel on the outside of the curve. This has the disadvantage that the rear wheel on the outside of the curve contributes little to the vehicle braking, and that the rear wheel on the inside of the curve tends toward skidding. Because much less slip occurs on the rear wheel on the outside of the curve than on the front wheel on the outside of the curve, the vehicle may unexpectedly, and disadvantageously, oversteer when the anti-skid mode begins. For instance, if the wheels on one side of the vehicle are traveling on a strip of road with good traction, and the wheels on the other side of the vehicle come into contact with wet, slippery ice, then the brake pressure modulator of the front wheel that is moving on the road with good traction causes the rear wheel diagonally away from it, traveling on the ice, to lock or skid. For the front wheel running on the ice, the brake pressure is reduced virtually to zero, with the disadvantageous result that the rear wheel diagonally opposite it contributes practically nothing to vehicle braking. Under these conditions, even though two independently functioning brake pressure modulators have been installed, the stopping distances are therefore disadvantageously long.

Another vehicle brake system with four brakable wheels, known from U.S. Pat. No. 4,600,244, has an anti-skid apparatus with two electrically controlled brake pressure modulators, two wheel rotation sensors, and two brake pressure adaptors, each of which again have a cylinder, a piston with a restoring spring, and a 2/2-way valve that is closable as a function of the piston motion. A brake pressure modulator and its wheel rotation sensor are assigned to one front wheel and its wheel brake. The other brake pressure modulator and its wheel rotation sensor belong to a diagonally opposed rear wheel and its wheel brake. The brake pressure adaptor connected to the brake pressure modulator of the front wheel is intended for the opposed front wheel brake. Logically, the other brake pressure adaptor connected to the brake pressure modulator of the rear wheel brake is intended for the second rear wheel brake. It will be appreciated that brake pressures are accordingly modulated per axle. On the one hand, this may have the advantage that despite load-dependent and deceleration-dependent changes in axle load during decelerated straight-ahead travel, good utilization of the traction of a road by the wheels of the front axle and the wheels of the rear axle is attained; but on the other hand, while cornering, wheels on the inside of the curve may be overbraked, or wheels on the outside of the curve may not be braked as hard as possible, depending on whether the wheel rotation sensor associated with one vehicle axle happens to be on the side of the vehicle that is on the outside or the inside of the curve. Experience has shown that on roads meant for traffic that normally keeps to the right, the strip of road used by the right wheels of a vehicle often freezes sooner than the strip used by the left wheels of the vehicle. For the association of the front wheel rotation sensor with the right front wheel disclosed in this known vehicle brake system, this has the disadvantage that if the rightward strip of the road freezes, the left front wheel, which typically is still on a strip of road that has traction, is virtually unbraked, thus resulting in longer stopping distances. If this happens when the vehicle is cornering to the left, relief of the rear wheel on the inside of the curve can make the braking forces at this rear wheel virtually disappear.

OBJECT AND SUMMARY OF THE INVENTION

The advantages of the vehicle brake system according to the invention are that modulating the brake pressures per side of the vehicle enables better control of the vehicle during braking on curves, and that on roads in which the two sides of a lane have different traction, the vehicle can be braked better and therefore has shorter stopping distances.

Another feature defined herein assures that if one brake circuit fails, the rear wheel brake of the intact circuit can be supplied with brake pressure from the brake pressure source without hindrance. Since as provided by the invention only the rear wheel brakes are supplied from the brake pressure source via brake pressure adaptors, braking is safer, because failure of the safety device, which in principle cannot be entirely precluded, will affect only the rear wheel brake, which in any case contributes very little to braking the vehicle. There is also disclosed a safety device of particularly simple, inexpensive design. Another characteristic revealed is to speed up the opening of the 2/2-way valve in a safety-related situation. As a result, in the anti-skid mode, rear wheel brake pressure is rapidly available in the event that the brake pressure modulator that caused a brake pressure reduction via the brake pressure adaptor, or the brake circuit supplying that brake pressure modulator, should fail.

A still further advantage is that whenever the rear wheels coincidentally tend to skid earlier than the front wheels, which cannot be detected by the wheel rotation sensors associated with the front wheels, brake pressures are reduced to improve the vehicle handling and accordingly to make it easier for the driver to control. Other characteristics revealed herein disclose alternative exemplary embodiments of a vehicle brake system having the characteristics discussed later herein.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE shows an exemplary embodiment of the vehicle brake system according to the invention.

DESCRIPTION OF THE PREFERRED EMBODIMENT

The vehicle brake system 2 has a dual-circuit brake pressure source 3, a brake pedal 4, a brake pedal rod 5, a brake booster 6, two brake circuits I and II, front wheel brakes 7, 8, rear wheel brakes 9, 10, and an anti-skid apparatus 11.

The dual-circuit brake pressure source 3 is for instance embodied as a so-called tandem master brake cylinder. To generate brake pressures, the brake pressure source 3 is controllable by means of the brake pedal 4 via the brake pedal rod 5. The brake booster 6 increases the force by which the brake pedal 4 can be actuated. The brake booster 6 can be found in the prior art, for instance, and may be embodied as a so-called vacuum brake booster. The brake pressure source 3 has a main connection 12 for the brake circuit I and a main connection 13 for the brake circuit II. The brake circuits I and II are embodied as so-called diagonal brake circuits. The right front wheel brake 7 and the left rear wheel brake 9 are associated with the brake circuit I, so that during normal braking, these wheel brakes 7 and 9 can be supplied with brake pressures through the main connection 12. Similarly, the left front wheel brake 8 and the right rear wheel brake 10 of the brake circuit II are supplied with brake pressures through the main connection 13. Wheels, not shown, are associated with the wheel brakes 7-10. It does not matter whether the wheels are single wheels or dual wheels. The wheel brakes 7-10 shown in the drawing each have one brake cylinder 14 and a brake piston 15 displaceable in it, as an example. In the context of this patent application it does not matter whether the brake cylinder 14 is part of a drum brake or a disk brake, or whether two brake pistons 15 or two brake cylinders 14 may optionally be associated with one wheel.

The anti-skid apparatus 11 includes a brake pressure modulator 16 that belongs to the brake circuit I; a brake pressure modulator 17 that belongs to the brake circuit II; wheel rotation sensors 19, 20 and 21, 22; and one further sensor 23. The wheel rotation sensors each comprise a signal transducer 19 and 21, respectively, and a respective element 20 and 22 that is coupled to the associated front wheel and upon its rotation trips wheel rotation angle signals in the respective signal transducer 19 or 21, which are supplied to the control unit 18. The sensor 23 is a sensor for observing transverse motion of the rear wheels or the rear axle. The sensor 23 may be embodied as a transverse acceleration sensor and may for instance be disposed between the center of gravity and the end of the vehicle. If it is disposed in the rear axle region or advantageously still farther to the rear of the vehicle, the sensor signals are stronger. It is assumed here that the front wheels are being braked optimally by the control unit 18 with the aid of the anti-skid apparatuses 16 and 17. It can accordingly also be presumed that an incipient displacement of the rear wheels relative to the front wheels is a consequence of a danger of wheel skidding that begins first at the rear wheels. The sensor 23 therefore serves to observe the transverse motion behavior of the rear wheels relative to the front wheels and, by means of the control unit 18, optionally by triggering one or both brake pressure modulators 16 and 17 in a manner to be described hereinafter, to reduce brake pressures sufficiently to limit the transverse motions of the rear wheels to such an extent that the vehicle remains controllable by the driver.

The brake pressure modulators 16 and 17 may be taken from the prior art. For example, they may be embodied such that they operate by the so-called recirculation principle. To this end, one anti-skid valve assembly 24 is disposed between the master cylinder connections 12 and 13, respectively, of the brake pressure source 3 and the respective front wheel brakes 7 or 8. The anti-skid valve assemblies 24 are embodied as 3/3-way magnetic valves of a known type, which in their basic positions connect the main connections 12 and 13, respectively, to the wheel brakes 7 and 8. In their first switching positions, the wheel brakes 7 and 8 are disconnected from the main connections 12 and 13, respectively. In their second switching positions, the 3/3-way magnetic valves 24 connect the wheel brakes 7 and 8 to inlets 25 of recirculating pumps 26. Outlets 27 of these recirculating pumps 26 communicate permanently with the main connections 12 and 13. However, the outlets 27 also communicate with inlets 24a of the 3/3-way magnetic valves 24. Low-pressure reservoirs 28 taken from the prior art may also be associated with the inlets 25 of the recirculating pumps 26, for temporarily holding pressure fluid from the wheel brakes 7 and 8, respectively, at low pressures in a range of up to 5 bar, for instance. This makes it possible, by switching over the 3/3-way magnetic valves 24, to reduce brake pressures in the wheel brakes 7 and 8 rapidly while the recirculating pumps 26, which are drivable by a drive motor 29, are actuated, or whenever the pumping capacity of the recirculating pumps 26 is limited for the sake of reducing the weight. This is particularly true if the drive motor 29 is an electric motor that is not switched on by the control unit 18 until the danger of wheel skidding is detected and is intended to draw as little current as possible from the on-board electrical system.

The anti-skid apparatus 11 also includes brake pressure adaptors 30 and 31 and safety devices 32 and 33. The brake pressure adaptors 30 and 31 each have one cylinder 34, one piston 35, one piston restoring spring 36 and one 2/2-way valve 37. The 2/2-way valve 37 is embodied as a valve having a valve seat 38 and a valve ball 39. The valve ball 39 is subject to the force of a valve closing spring 40 and can be lifted from the valve seat 38 by the force of the piston restoring spring 36, with the interposition of an opening tappet 41. Accordingly, the force of the piston restoring spring 36 overcomes the force of the valve closing spring 40. One connection 42 of the 2/2-way valve 37 of the brake pressure adaptor 30 communicates permanently with the main connection 13 of the brake circuit II. Between the valve seat 38 of the piston 35, the brake pressure adaptor 30 has a further connection 43, which communicates continuously with the right rear wheel brake In the region of one end 44 of the cylinder 34, on which the piston restoring spring 36 is supported, there is a third connection 45, which communicates permanently with the front wheel brake on the same side, that is, the right front wheel brake 7 Accordingly, it will now be appreciated that during normal braking, with the brake pressure source 3 in proper condition and accordingly with equally high brake pressures at the main connections 12 and 13, the piston 35 is exposed to the brake pressure from the main connection 12 on the one hand and to the brake pressure from the main connection 13 on the other. These two brake pressures balance one another, so that because of the disposition of the piston restoring spring 36 the piston 35 maintains the basic position shown during normal braking.

If characteristically varying signal trains from the wheel rotation sensor 19 cause the control unit 18 to actuate the brake pressure modulator 16 in order to reduce the brake pressure in the right front wheel brake 7, then the pressure at the third connection 45 of the brake pressure adaptor 30 also drops. As a result, the piston 35 deflects from the pressure from the main connection 13, with the result that the valve closing spring 40 displaces the valve ball 39 behind the piston 35 and finally presses it against the valve seat 38. The right rear wheel brake 10 is consequently disconnected from the main connection 13, and by further deflection counter to the force of the piston restoring spring 36, which by itself can be embodied as a weak spring, the piston 35 provides for adaptation of the pressure of the right rear wheel brake 10 to that of the right front wheel brake 7.

Because the brake pressure adaptor 31 belonging to the left rear wheel brake 9 is embodied identically, it need not be described again here. It should therefore merely be mentioned that its third connection 45 communicates with the left front wheel brake 8.

Hydraulically controllable 3/2-way valves of the type described in DE-OS 24 49 481 and DE-OS 37 25 811 may for instance be used as the safety devices 32 and 33. According to the invention, for simpler engineering, the safety devices 32 and 33 can also be embodied as hydraulically controllable 2/2-way valves, which in the safety-related situations in which they are needed form a bypass that opens around the respectively associated 2/2-way valve 37.

For this purpose, the safety device 32 has a cylinder 46, with a control connection 48 disposed in the region of one end 47; a valve closing spring 49, supported on this end 47; a piston 50 loaded by 15 the valve closing spring 49; a valve closing body 51 embodied as a ball; and a valve seat 52 on the other end 53 of the cylinder 46. Beginning at the valve seat 52, the end 53 has a connection 54, which communicates continuously with the main connection 13 of the brake circuit II. In the region between the valve seat 52 and the piston 50, the cylinder 46 has a further connection 55, which communicates continuously with the right rear wheel brake 10. The effect of the valve closing spring 49 is that in the normal situation the valve closing body 51 closes the valve seat 52. The valve closing spring 49 is embodied such that the valve closing body 51 is actuated, it can be compressed through the connection 54 by pressure from the main connection 13 of the brake circuit II. On the other hand, however, the control connection 48 communicates continuously with the main connection 12 of the brake circuit I. As a result, pressure present at the main connection 12 can prevent compression of the valve closing spring 49 and can prevent the valve closing body 51 from lifting away from the valve seat 52, even if when the 2/2-way valve 37 is in the basic position shown rear wheel brake pressure acts through the connection 55 upon the piston 50 counter to the force of the valve closing spring 49.

Because the safety device 33 is embodied identically to the safety device 32 described above, it is sufficient to note that the safety device 33 is provided in order to connect the left rear wheel brake 9 with the main connection 12 of the brake circuit I. Function of the vehicle brake system:

As already indicated, the anti-skid valve assemblies 24 of both anti-skid apparatuses 16 and 17 are normally in their basic positions. As a result, an actuation of the brake pedal 4 via the brake pedal rod 5, optionally with the aid of the brake booster 6, causes the development of brake pressures in the brake pressure source 3, which via the main connections 12 and 13 reach the brake circuits I and II and there, by means of the anti-skid valve assemblies 24, supply the front wheel brakes 7 and 8 with brake pressures. In the same manner as the front wheel brakes 7 and 8, the cylinders 34 of the brake pressure adaptors 30 and 31 are supplied with brake pressures in the region of the piston restoring springs 36, through the anti-skid valve assemblies 24 via the third connections 45, which now act as control connections; the result is that the pistons 35 are actuated in the direction of opening the 2/2-way valves 37. Accordingly the 2/2-way valves 37 are now in their opening positions. At the same time, however, the brake pressure source 3, via the main connections 12 and 13, also supplies the connections 42 of the 2/2-way valves 37 with brake pressures and as a result, through these valves and through the further connections 43, supplies brake pressures to the rear wheel brakes 10 and 9. Since as already noted the same pressures normally prevail in brake circuits I and II, the pistons 35 remain in the basic positions shown. Since the pistons 50 of the safety devices 32 and 33 are pressure-balanced in the axial direction, as already noted earlier, the valve closing bodies 51 remain on their valve seats 52. As will be understood, and intentionally, the brake pressure buildup for the rear wheel brakes 10 and 9 is effected through the normally open 2/2-way valves 37.

If during the actuation of the brake pedal 4, one or both of the wheel rotation sensors 19, 21 send signal trains to the control unit 18 that lead the control unit to conclude that there is a danger of wheel locking or skidding, the control unit 18 then controls one or both of the brake pressure modulators 16 and/or 17. The anti-skid valve assembly 24 that they contain is therefore switched over, for instance to the second switching position, to lower the brake pressure. At the same time, the drive motor 29 for both recirculating pumps 26 is switched on. As a result, quantities of pressure fluid flow out of the wheel brake 7 or 8, as conditions dictate, to the applicable recirculating pump 26, which pump it back to the brake pressure source 3. With the reduction of brake pressure in the wheel brake 7 or 8, the pressure also drops at the associated third connection 45 of the applicable brake pressure adaptor 30 or 31, so that the applicable piston 35 deflects from the pressure in the connection 42 communicating with the main connection 12 or 13. As a result, the respective valve closing body 39 assumes its seat on the valve seat 38, with the result that the applicable rear wheel brake 10 or 9 is now disconnected from the brake pressure source 3. As the brake pressure continues to drop, the applicable piston 35 at the third connection 45 deflects from the pressure contained in the wheel brake 10 or 9, so that an adaptation of the rear wheel brake pressure to the front wheel brake pressure is effected as a result.

If signals from the wheel rotation sensors 19 or/and 21 cause the control unit 18 to detect that further reduction of brake pressures is now no longer necessary, then the control unit directs the applicable anti-skid valve assembly 24 to the first control position, the so-called brake pressure holding position. Contrarily, if it detects that the danger of wheel locking has been overcome and brake pressures can be increased again, then the control unit 18 causes the applicable anti-skid valve assembly 24 to return to its basic position, so that the pressure of the brake pressure source flows to the applicable front wheel brake 7 or 8. The brake pressure accordingly rises again in the applicable wheel brakes 7 or 8, with the result that the applicable piston 35 is also displaced toward its outset position, thereby increasing the brake pressure in the associated rear wheel brake 10 or 9, and finally also lifting the applicable valve closing body 39 from the associated valve seat 38. As a result, the brake pressure source 3 again communicates with the applicable rear brake 10 or 9.

If the situation arises for instance that a pressure increase of the main connection 12 is impossible because of a leak in the brake circuit I, then the right front wheel brake 7 does not receive any braking pressure. Another result of this is that no pressure rise that could reinforce the piston 50 in the direction of action of the closing spring 49 arises at the control connection 48 of the safety device 32. Since the associated rear wheel brake 10 is a component of the brake circuit II and is to be supplied with pressure from the main connection 13, this pressure, via the connection 54, brings about action upon the valve closing body 51, enabling it to deflect counter to the force of the valve closing spring 49. A gap is created between the valve closing body 49 and its valve seat 52, through which pressure fluid from the brake pressure source 3 can flow to the rear wheel brake 10. Since with the valve closing body 51 lifted this pressure acts upon the piston 50, the piston 50 advantageously rapidly moves toward the end 47, and pressure fluid then flows practically unhindered from the main connection 13 to the rear wheel brake 10. The safety device 32 therefore supplies the rear wheel brake 10 with brake pressure regardless of whether, in the absence of pressure from the main connection 12, the piston 35 is deflecting from the pressure from the main connection 13 and accordingly, as is proper for anti-skid operation, causing the valve closing body 39 to move toward the valve seat 38.

If a pressure drop occurs in the brake circuit I during a braking operation in which anti-skid operation happens to occur, then regardless of the position of the associated piston 35, the pressure of the main connection 13 again predominates over the vanishing pressure of the main connection 12, so that it is possible to force the closing body 51 away from its valve seat 52. As a result, the rear wheel is brakable. In the same way, in the event of a pressure drop in the brake circuit II, provision is made for brake pressure in the other rear wheel brake.

As already mentioned, the situation may arise in which there is a danger of wheel locking at one of the rear wheels, while the front wheel on the same side still exhibits no tendency toward locking and therefore the control unit 18 is unable to detect a danger of wheel locking. In such a case, the rear wheels tend to depart from their proper tracks on the road. The wheels of the rear axle shift laterally relative to the wheels of the front axle, while the front wheels are generating entirely adequate cornering forces. The sensor 23 now serves to make this situation apparent to the control unit 18, by emitting signals accordingly. The control unit 18 thereupon takes control, by controlling at least one of the brake pressure modulators 16 and 17 in the direction of a brake pressure reduction. If the control unit 18 subsequently detects from signals of the sensor 23 that a brake pressure reduction is no longer necessary, it returns the at least one brake pressure modulator 16 or 17 to the brake pressure buildup position. Since an undesirable drifting of the rear wheels during braking operation can occur without the onset of anti-skid operation via the wheel rotation sensors 19 and 21, or during anti-skid operation, a logic system accommodated in the control unit 18 is embodied such that evaluated signals from the sensor 23 have priority over signals from the wheel rotation sensors 19 and 21. To this end, the control unit 18 may be embodied in a manner described in International Patent Application WO 88/00542. The sensors named in this document are a transverse acceleration sensor, and both a yawing rate sensor and a yawing acceleration sensor. For the intended purpose, a yawing acceleration sensor can therefore replace a transverse acceleration sensor or transverse motion sensor, because excessive drift of the rear wheels relative to the track of the front wheels causes the vehicle to yaw.

As the description has already suggested, it does not intrinsically matter how the two brake pressure modulators 16 and 17 are embodied, or in other words whether they are controlled via electrical wheel rotation sensors 19 and 21 and an electrical control unit 18, or mechanically, as described in European Patent 0 178 817. The principle by which the brake pressure adaptors 30 and 31 associated with the rear wheels function is equally unimportant.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A vehicle brake system having a dual-circuit brake pressure source, two brake circuits (12, 13) and wheel brakes (7-10) associated with them for front and rear wheels, and an anti-skid apparatus (11), the anti-skid apparatus having two brake pressure modulators (16, 17) and two brake pressure adaptors (30, 31), each brake pressure adaptor (30, 31) has a cylinder (34) and piston (35) displaceable in said cylinder, said piston is acted upon by a pressure from an associated brake pressure modulator (16, 17) for control purposes, a check valve (37) is provided between the piston (35) and an associated connection (12, 13) of the master brake cylinder (3) with said cylinder (34), said check valve has a stationary valve seat (38), a movable closing element (39) and a valve closing spring (40) that acts on the valve closing element (39), the valve closing spring (40) is weaker than the restoring spring (36) and said check valve (37) is opened in a direction of the master brake cylinder in the event of a pressure excess of an associated rear wheel brake relative to the master brake cylinder (3), each brake pressure modulator being controllable as a function of a rotation behavior of an associated wheel, the wheels being distributed on two sides of the vehicle, and each brake pressure adaptor being hydraulically controllable by one of the brake pressure modulators at a time to adapt the brake pressure of a wheel brake connected to it to the brake pressure of the wheel brake that is directly connected to the brake pressure modulator, each brake pressure modulator is controllable as a function of a rotational behavior of one associated front wheel and is connected to that wheel brake, and a brake pressure adaptor connected to the respective brake pressure modulator is connected to a wheel brake of a rear wheel on the same side of the vehicle.

2. A vehicle brake system as defined by claim 1, which includes a safety device (32, 33) which forms a bypass associated with an associated brake pressure adaptor (30, 31), by means of said safety device the rear wheel brake (10, 9) is supplied with pressure from the brake pressure source (3).

3. A vehicle brake system as defined by claim 2, in which an electrically operating wheel rotation sensor (19, 21) is associated with each front wheel; an electric control unit (18) is connected to both wheel rotation sensors (19, 21) for acting electrically upon the brake pressure modulators (16, 17) as a function of the wheel rotation behavior of the respectively associated wheel rotation sensor (19, 21); and that a sensor (23) that observes a transverse motion behavior of the rear wheels is associated with the control unit (18), the signals of said sensor (23) are observed by the control unit (18) so that when threshold values are exceeded it controls at least one of the brake pressure modulators (16, 17).

4. A vehicle brake system as defined by claim 3, in which said sensor (23) is embodied as a transverse acceleration sensor and is disposed in a region located between the center of gravity and one end of the vehicle.

5. A vehicle brake system as defined by claim 3, in which said sensor (23) is embodied as a yawing motion sensor.

6. A vehicle brake system as defined by claim 4, in which said sensor (23) is embodied as a yawing motion sensor.

7. A vehicle brake system as defined by claim 2, in which each safety device (32, 33) includes a 2/2-way valve (51, 52) and a closing device, which has a cylinder (46), with a control connection (48) connected to the brake pressure source (3), and a piston (50) that by means of this control connection (48) is subjected to the pressure of the brake pressure source (3).

8. A vehicle brake system as defined by claim 7, in which an electrically operating wheel rotation sensor (19, 21) is associated with each front wheel; an electric control unit (18) is connected to both wheel rotation sensors (19, 21) for acting electrically upon the brake pressure modulators (16, 17) as a function of the wheel rotation behavior of the respectively associated wheel rotation sensor (19, 21); and that a sensor (23) that observes a transverse motion behavior of the rear wheels is associated with the control unit (18), the signals of said sensor (23) are observed by the control unit (18) so that when threshold values are exceeded it controls at least one of the brake pressure modulators (16, 17).

9. A vehicle brake system as defined by claim 8, in which said sensor (23) is embodied as a transverse acceleration sensor and is disposed in a region located between the center of gravity and one end of the vehicle.

10. A vehicle brake system as defined by claim 8, in which said sensor (23) is embodied as a yawing motion sensor.

11. A vehicle brake system as defined by claim 9, in which said sensor (23) is embodied as a yawing motion sensor.

12. A vehicle brake system as defined by claim 7, in which in a region of the control connection (48), a valve closing spring (49) embodied as a compression spring is disposed in the cylinder (46); that opposite this valve closing spring (49), a closing body (51) of the 2/2-way valve is coupled to the piston (50); that a valve seat (52) associated with the valve closing body (51) is disposed on an end (53) of the cylinder (46) opposite the control connection (48); said valve seat (52) communicates permanently with the brake pressure source (3); and at least one connection (55) disposed in the region of the valve seat (52) is connected to the rear wheel brake (10) and the associated brake pressure adaptor (30, 31).

13. A vehicle brake system as defined by claim 12, in which an electrically operating wheel rotation sensor (19, 21) is associated with each front wheel; an electric control unit (18) is connected to both wheel rotation sensors (19, 21) for acting electrically upon the brake pressure modulators (16, 17) as a function of the wheel rotation behavior of the respectively associated wheel rotation sensor (19, 21); and that a sensor (23) that observes a transverse motion behavior of the rear wheels is associated with the control unit (18), the signals of said sensor (23) are observed by the control unit (18) so that when threshold values are exceeded it controls at least one of the brake pressure modulators (16, 17).

14. A vehicle brake system as defined by claim 13, in which said sensor (23) is embodied as a transverse acceleration sensor and is disposed in a region located between the center of gravity and one end of the vehicle.

15. A vehicle brake system as defined by claim 13, in which said sensor (23) is embodied as a yawing motion sensor.

16. A vehicle brake system as defined by claim 14, in which said sensor (23) is embodied as a yawing motion sensor.

17. A vehicle brake system as defined by claim 1, in which an electrically operating wheel rotation sensor (19, 21) is associated with each front wheel; an electric control unit (18) is connected to both wheel rotation sensors (19, 21) for acting electrically upon the brake pressure modulators (16, 17) as a function of the wheel rotation behavior of the respectively associated wheel rotation sensor (19, 21); and that a sensor (23) that observes a transverse motion behavior of the rear wheels is associated with the control unit (18), the signals of said sensor (23) are observed by the control unit (18) so that when threshold values are exceeded it controls at least one of the brake pressure modulators (16, 17).

18. A vehicle brake system as defined by claim 17, in which said sensor (23) is embodied as a transverse acceleration sensor and is disposed in a region located between the center of gravity and one end of the vehicle.

19. A vehicle brake system as defined by claim 17, in which said sensor (23) is embodied as a yawing motion sensor.

20. A vehicle brake system as defined by claim 18, in which said sensor (23) is embodied as a yawing motion sensor.

* * * * *